United States Patent
Axelrod et al.

(10) Patent No.: US 7,288,275 B2
(45) Date of Patent: Oct. 30, 2007

(54) APPARATUS AND PROCESS FOR FORMING PET TREATS

(75) Inventors: Glen S. Axelrod, Colts Neck, NJ (US); Ajay Gajria, Monmouth Junction, NJ (US); Richard Best, Fond Du Lac, WI (US)

(73) Assignee: T.F.H. Publications, Inc, Neptune City, NJ (US)

( * ) Notice: Subject to any disclaimer, the term of this patent is extended or adjusted under 35 U.S.C. 154(b) by 0 days.

(21) Appl. No.: 10/753,897

(22) Filed: Jan. 8, 2004

(65) Prior Publication Data

US 2005/0153040 A1 Jul. 14, 2005

(51) Int. Cl.
*A01K 29/00* (2006.01)
*A23K 1/00* (2006.01)

(52) U.S. Cl. .................. 426/473; 426/512; 426/513; 426/517; 426/518; 426/519; 426/520; 426/524; 426/805; 119/710

(58) Field of Classification Search .......... 426/443, 426/468, 473, 502–504, 513, 517–520, 524, 426/805; 119/709–711
See application file for complete search history.

(56) References Cited

U.S. PATENT DOCUMENTS

| | | | | |
|---|---|---|---|---|
| 4,239,785 A * | 12/1980 | Roth | ............................ | 426/266 |
| 4,468,186 A | 8/1984 | Sollich | ........................ | 425/294 |
| 4,473,344 A | 9/1984 | Sollich | ........................ | 425/130 |
| 4,868,002 A * | 9/1989 | Scaglione et al. | ........... | 426/641 |
| 5,045,339 A * | 9/1991 | Ducharme | ................... | 426/641 |
| 5,200,212 A | 4/1993 | Axelrod | ........................... | 426/2 |
| 5,240,720 A | 8/1993 | Axelrod | ........................... | 426/2 |
| 5,476,069 A | 12/1995 | Axelrod | ....................... | 119/709 |
| 5,500,239 A * | 3/1996 | Hayward | ..................... | 426/516 |
| 5,514,408 A | 5/1996 | Lan et al. | .................... | 426/656 |
| 5,731,029 A * | 3/1998 | Karwowski et al. | ......... | 426/646 |
| 5,827,561 A * | 10/1998 | Duve | .......................... | 426/513 |
| 5,827,565 A | 10/1998 | Axelrod | ....................... | 426/623 |
| 5,941,197 A | 8/1999 | Axelrod | ....................... | 119/710 |
| 6,042,873 A * | 3/2000 | Lawson | ....................... | 426/657 |
| 6,093,427 A | 7/2000 | Axelrod | ....................... | 426/104 |
| 6,093,441 A | 7/2000 | Axelrod | ....................... | 426/632 |
| 6,110,521 A | 8/2000 | Axelrod | ....................... | 426/549 |
| 6,126,978 A | 10/2000 | Axelrod | ....................... | 426/285 |
| 6,159,516 A | 12/2000 | Axelrod et al. | ............. | 426/456 |
| 6,180,161 B1 | 1/2001 | Axelrod | ....................... | 426/623 |
| 6,455,083 B1 * | 9/2002 | Wang | .......................... | 426/104 |
| 6,584,938 B2 * | 7/2003 | Sherrill et al. | ............. | 119/710 |
| 6,586,027 B2 | 7/2003 | Axelrod et al. | ............. | 426/132 |
| 6,799,536 B1 * | 10/2004 | Jia et al. | ...................... | 119/710 |
| 6,886,496 B1 * | 5/2005 | Brown | ......................... | 119/710 |
| 2002/0039608 A1 | 4/2002 | Sirohi et al. | ................... | 426/94 |
| 2003/0170370 A1 | 9/2003 | Evenson et al. | ............. | 426/620 |

* cited by examiner

*Primary Examiner*—Drew Becker
(74) *Attorney, Agent, or Firm*—Grossman, Tucker, Perreault & Pfleger PLLC

(57) ABSTRACT

An animal chew is provided formed by rolling a mixture of binder and base material into a sheet. Base material, such as an edible material, including but not limited to starch, protein matter, vegetable or plant matter, is mixed with a binder. The mixture is then supplied to a screw conveyor followed by introduction onto rollers to form a sheet. The sheet may then be cut into a desired shape. The overall process may be made continuous, and the manufacturing conditions may be selectively controlled at each step, with respect to variable a such as temperature and moisture levels, to substantially maintain the overall nutritional value of the formed edible compositions.

10 Claims, 1 Drawing Sheet

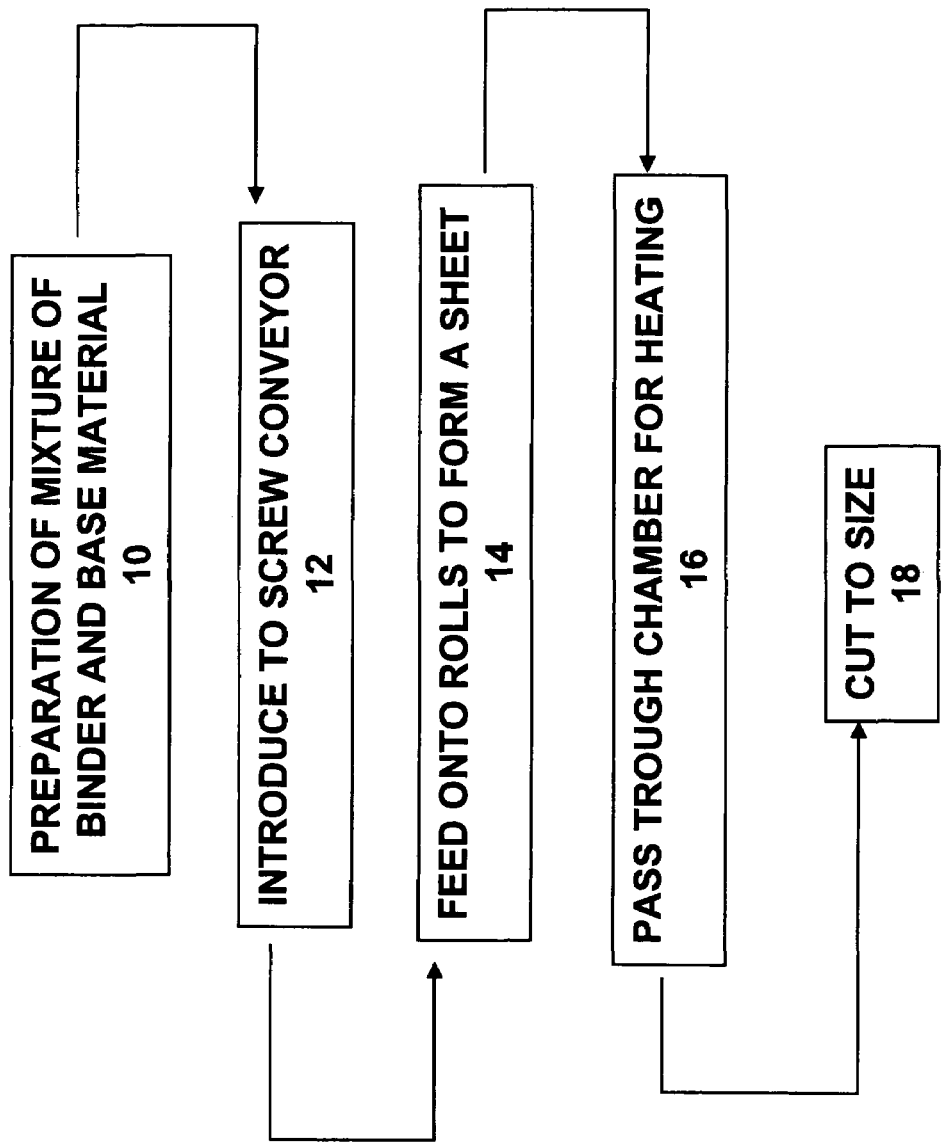

APPARATUS AND PROCESS FOR FORMING PET TREATS

FIELD OF THE INVENTION

The invention herein relates to animal treats or chews, and more particularly to an apparatus and process for continuously producing animal treats or chews from an unlimited number of edible components in a continuous process with comparatively high production output, into shapes such as a bar, while substantially maintaining the nutritional value of all of the ingredients that may be employed.

BACKGROUND OF THE INVENTION

Most dogs enjoy chewing on things although preferences vary as to the hardness of the substances favored. Some dogs like to chew on very hard materials such as cow bones, wood, nylon or polyurethane, others prefer softer chews such as rawhide, while still others favor freeze dried snacks. Some dogs, due to their age, may not be able to chew on the hard substances. Young dogs have insufficiently developed teeth, while old dogs may have diseased gums or may have lost some of their teeth.

In appreciation of this problem, there has been previously developed an edible dog chew that is digestible and nutritious along with a texture or hardness which is individually adjustable by the application of heat to suit a wide variety of dog's preferences or needs. Such dog chews utilize a mixture containing primarily casein and are disclosed in U.S. Pat. Nos. 5,200,212 and 5,240,720, which are assigned to T.F.H. Publications, Inc. Other wholly digestible, edible dog chews have also been developed that are formed largely from various starch products.

In U.S. Pat. No. 5,827,565 owned by T.F.H. Publications Inc. there is disclosed a process for making a heat expandable dog chew comprised primarily of injection molding potato starch granules and an attractant. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced can be modified in texture or hardness by subsequent heating, preferably in a microwave oven.

In U.S. Pat. No. 6,126,978, which is a continuation-in-part of U.S. Pat. No. 5,827,565, and which is owned by T.F.H. Publications Inc., there is disclosed a dog chew having natural fruit flavor to increase the dog's appetite for such chew. Such fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintains the basic ingredient of a heat-expandable starch, such as potato starch. Fruit flavoring may be added to the granules of a mixture of potato starch, water and calcium carbonate along with natural fruit flavorings.

Attention is also directed to the following U.S. patents, owned by T.F.H. Publications Inc.: U.S. Pat. No. 5,476,069 entitled "Molded Rawhide Chew Toy"; U.S. patent application Ser. No. 08/923,070 filed Sep. 3, 1997 entitled "Vegetable Based Dog Chew" now U.S. Pat. No. 6,093,427; U.S. patent application Ser. No. 08/738,423 filed Oct. 25, 1997 entitled "Edible Dog Chew" now U.S. Pat. No. 5,827, 565; U.S. patent application Ser. No. 08/784,834 filed Jan. 17, 1997 entitled "Carrot-Based Dog Chew" now U.S. Pat. No. 5,941,197; U.S. patent application Ser. No. 09/114,872 filed Jul. 14, 1998 entitled "Heat Modifiable Edible Dog Chew" now U.S. Pat. No. 6,180,161; U.S. patent application Ser. No. 09/138,804 filed Aug. 21, 1998 entitled "Improved Edible Dog Chew" now U.S. Pat No. 6,126,978; U.S. patent application Ser. No. 09/116,070 filed Jul. 15, 1998 entitled "Wheat & Casein Dow Chew With Modifiable Texture" now U.S. Pat. No. 6,110,521; U.S. patent application Ser. No. 09/116,555 filed Jul. 15, 1998 entitled "Heat Modifiable Peanut Dog Chew" now U.S. Pat. No. 6,093,441; U.S. patent application Ser. No. 09/227,767 filed Jan. 8, 1999 entitled "Method of Molding Edible Starch" now U.S. Pat. No. 6,159,516. In addition to such patents, attention is also directed to the art cited in said patents and applications, as such art may relate to the field of molded edible products.

Additionally, while the above prior art confirms the variety successful efforts to provide an edible chew, there remains, of course, a continuing need to develop other techniques of manufacture that will provide expanded and more efficient production capability, without alternating the effect on product quality.

Accordingly, it is an object of the present invention to provide and animal chew or animal treat that can be easily and cost effectively manufactured, which process may be made continuous, and which process is suitable for any edible composition currently utilized to manufacture pet treat type products, and which process allows one to, e.g, continuously produce an animal chew into a shape of a bar while generally maintaining the nutritional value of the edible components, and other ingredients, that are selected for such manufacture.

SUMMARY

In a first non-limiting embodiment, the present invention is directed at a method of manufacturing an animal chew comprising initially providing a base material and a preheated binder and forming a mixture, wherein the composition has a selected moisture level "x". This is followed by introducing said mixture to a screw conveyor wherein the temperature of the mixture in the screw conveyor is maintained at a temperature of at or below about 200° F. (95° C.) and introducing the product so formed on to rollers which form a sheet and wherein said rollers provide heating and/or cooling. The product is then introduced into a heated chamber wherein the temperature is maintained at or below 200° F. (95° C.). Finally, the product may be cut into a desired shape, wherein the final moisture level is "y", and y<x.

In a second non limiting embodiment, the present invention is directed at an edible animal chew toy formed by combining a base material selected from edible material such as starch, rice meal, soybean, casein, denatured and partially hydrolyzed casein, protein, rawhide, dairy, meat by-products, plant, vegetable matter or animal matter, and mixtures thereof, along with a preheated binder to form a mixture. The mixture is introduced to a screw conveyor wherein the temperature of the mixture in the screw conveyor is maintained at a selected temperature, followed by introduction onto rollers to form a sheet and wherein said rollers provide cooling. The product is then introduced into a heated chamber at a selected temperature and then cut into a desired shape, wherein the final moisture level is "y", and y<x., and wherein said selected temperatures are selected such that the base material is not substantially thermally degraded by such temperature selection.

DESCRIPTION OF THE DRAWINGS

FIG. 1 illustrates in flow-chart form some of the general processing steps for preparing the subject animal treat.

DETAILED DESCRIPTION OF THE INVENTION

In accordance with the present invention, a method of manufacturing an animal chew or animal treat is disclosed. With attention directed at FIG. 1, the method initially involves the formation of mixture 10 of binder and base material. In general, this involves the combination of an edible base component with a suitable binder, which can all be selected depending upon the needs of any given animal. For example, an edible base component may be sourced from products identified as starch, rice meal, soybean, casein, denatured and partially hydrolyzed casein, protein, rawhide, dairy, meat by-products, plant, vegetable matter or animal matter. Accordingly, any edible component may be utilized, without limitation, and of course ideally targeted to the particular needs of the animal.

Furthermore, while edible components may be preferred, it is also contemplated that synthetic polymers may be employed, such as thermoplastic polymers, such as polyamides, polyurethanes as well as ethylene copolymers, such as poly(ethylene acrylic acid) and poly(ethylene vinyl alcohol). In the case of such resins, the process herein can also be applied and the conditions selected to avoid significant degradation of such resins in the sense that the mechanical properties of the resins (tensile strength, modulus) in their final configured shape, is substantially maintained.

Accordingly, the base component may include vitamins, minerals, and/or herbs of any desired variety, and at any desired concentration, and as may be appropriate for the animal for which the animal chew is targeted. For example, in the case of dogs, the vitamins may comprise A, C, $B_{12}$, D, E, thiamine, riboflavin, panthothenic acid, niacin, pyridoxine, folic acid and choline. In the case of cats, the vitamins may comprise vitamins A, C, $B_{12}$ D, E, and K, thiamine, riboflavin, pyridoxine, niacin, panthothenic acid, folic acid, biotin and choline.

Preferred minerals are calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium are required in gram amounts/day, whereas iron, zinc, copper, iodine, and selenium are only required in mg or .mu.g/day. The chew toy herein can therefore be modified to reflect a higher or lower concentration of a given mineral, according to nutritional requirements.

Turning next to the herbal component, the herbs herein are preferably selected from the group consisting of St. Johns Wort, Kava Kava, Ginkgo Biloba, Ginseng (Asian or Siberian varieties), Echinacea and mixtures thereof. Other herbs include Catsclaw, Camomile, Golden Seal, Saw Palmetto, Valerina, V. Agnus-Castus, Black Cohosh, Bilberry and Milk Thistle. Herbs may also include aloe, astragalus, burdock, chaomile, chestnut, coriolus, versicolor, couchgrass, crampbark, dandelion root, dong quai, elecampane, evening primrose, eyebright, false unicorn root, feverfew, garlic ginger, goldenseal, gota kola, grape seed extract, green tea, guggulipid, hawthorn, hops, ivy, licorice, milk thistle, misteltoes (American Asian and European varieties), motherwort, oats, osha, passion flower, pumpkin pygeum, red clover, rosemary, sarsparilla, skullcap, saw plametto, stinging nettle, wild indigo, wild yam and yerba mansa. In addition, glucosamines and/or chondroiton can be added to any of the embodiments described herein.

The binder component may include any material which serves to bind together the edible. component noted above. The binder may therefore include, but not be limited to, a binder which upon heating and cooling serves to bind the edible component together so that it can be readily processed and formed into, e.g., a sheet material. Alternatively, the binder may be one that binds the edible components together without the use of heat. Such binders may include one or more proteins soluble or dispersible in a neutral or alkaline aqueous solution and a powdery product selected from the group consisting of, e.g., a hydroxide of an alkaline earth metal.

One suitable binder composition which serves to bind upon application of heat and cooling includes a combination of water, gelatin, corn syrup and glycerin. It can therefore be appreciated that the binder composition itself may be consumed by the animal consistent with the edible characteristics of the animal chew that is formed herein. Other suitable binder compositions may include sucrose and/or mixtures of glucose and its polymers. Binders may also include solutions or slurries based upon various gums (e.g., guar, pectin, carragenan, xanthan, gellan, carboxy methylcellulose), proteins (e.g., gelatin, soy proteins, egg whites, hydrolyzed soy proteins), starches (e.g., pregelatinized, modified starches) and nutritive carbohydrate agents (sucrose, dextrose, corn syrup, honey, fruit juices). The binder therefore may be applied dissolved or dispersed in liquid form. Moisture, which may therefore be added or present in the base component/binder mix, is then selectively removed, as more fully described below.

Furthermore, certain binders may additionally comprise a fat (oil and/or solid) component. The fat component might comprise, e.g., 0.1 to 50% of the final chew product. Useful herein are fats and oils that are conventional for use in food products. The fat component may include lecithin and other emulsifiers, e.g., acetylated mono-glycerides, if desired.

The base material is therefore preferably combined with the binder and combined, as noted, to form a slurry type preparation. The base material, as noted, may include any edible composition suitable for preparing a pet treat. It should also be noted that formation of the dry mix slurry preparation may be accomplished by first mixing together any solid components to obtain a dry mix and then mixing the dry mix with liquid or fluid components. Alternatively, the solid components may be combined with the liquid components in one complete mixing step.

The mixture of base material and binder is then introduced into a screw conveyor (see 12 in FIG. 1) which may be heated. The screw conveyor, which may be an auger type conveyor, therefore serves to further mix the binder and base components and when heated, as applied to a mixture containing liquid, operates to increase the composition to an overall higher solids level, or stated another way, to a lower moisture level, in connection with those mixtures that contain moisture. It should be noted that the preferred screw/auger type conveyor does not contain a die nor does it develop pressure within a barrel as in conventional extrusion. Furthermore, in the case of a binder that binds the base components in the absence of heat, the screw conveyor may redistribute the binder within the base components so that more effective binding may take place.

Accordingly, the output of the screw conveyor is then fed onto rollers, which may be cooled as indicated at 14 in FIG.

1, which rollers serve to form a sheet material. In that regard, it can be appreciated that the binder and base component are introduced to two opposed rollers at the location of their circumferential surfaces. The rollers may optionally be heated or cooled, and each roller may be set to different temperatures and optionally contain a polished or non-stick type surface. Depending upon the spacing between the rollers, the sheet or web of material produced will be formed with a thickness that corresponds to the spacing between the rollers. The rollers therefore serve to press the binder and base component into sheet form, and the rollers may optionally be cooled to facilitate such sheet formation. In addition, the rollers themselves may optionally contain grooves and ridges, such that the ridges of one roller enters into the grooves of an opposing roller, thereby providing a cavity to form a ribbon of material. Therefore, the depth of engagement of the ridge into the groove will itself allow one to select the desired thickness for a ribbon of material to be produced, and ultimately cut into final shape. The sheet material so formed of any particular desired thickness is then delivered to a thermo-regulated chamber, preferably a tunnel, which surrounds and provides uniform heating. Accordingly, after the mixture has been shaped and rough sized by the roll mill, the resulting sheet may be discharged from the roll mill onto a conveyor which feeds into the thermo-regulated chamber. Optionally, the conveyor may be chilled to assist in further cooling the sheet prior to further thermo-regulation.

Passing through the aforementioned temperature controlled tunnel may therefore, among other things, serve to additionally harden the composition. In that context, the temperature of the tunnel may be adjusted depending upon the particular final solids level that one may desire, as the temperature of the tunnel serves to further remove liquid, such as moisture, thereby adding to the rigidity of the sheet that is formed. Accordingly, the temperature of the tunnel and the length of time in the tunnel can be conveniently adjusted, depending upon the binder and base components, and the desired hardness one may wish to achieve in the chew product. In addition, the tunnel may serve to provide cooling, if desired for a given selective composition.

The next step of the process involves cutting to a final desired shape. This can be accomplished in several ways. First, with the objective of forming a rectangular shaped bar, one can initially cut the sheet output along one axis such that the width of the bar is set. Then, a second cutter can be employed to set the length. Alternatively, this may be done in opposite order, or simultaneously. As an alternative to a bar configuration achieved by, e.g. lengthwise splitting and guillotine cutting, the sheet may be formed into different shapes using conventional processes known by those having skill in the art. For example, different shaped articles, such as a dog bone shape, may be die-cut from the sheet. Other cutting and forming methods may also be used to produce various shaped products from the roll formed sheet material. Suitable cutting and forming techniques may include water-jet cutting, hot knife, stamping, etc.

The process consistent with the present invention may therefore be used for manufacturing edible animal treats and/or edible animal chews. Animal treats consistent with the present invention are intended to be fully consumed by a pet or animal. As such, when the desired product is an animal treat it may also be formed from ingredients providing nutritional benefit. Similarly, animal chews consistent with the present invention may be intended to provide nutritional value along with oral health benefits, serving to massage the gums of the pets during the chewing action, etc.

Furthermore, as noted earlier, the product herein may alternatively be formed form edible or even non-edible ingredients, wherein the non-edible ingredient may be selected, among other reasons, to provide extended durability when chewed by an animal.

Accordingly, it should only be understood that the method according to the present invention may be used to manufacture products having varying physical and/or nutritional characteristics, which method avoids some of the more shear intensive procedures found in techniques such as injection molding. Furthermore, it should also be understood by those having skill in the art, however, that any classification of "treat" or "chew" as used herein has no bearing on the scope of the invention herein. In addition, it must also be noted that the concept of animal treat or chew herein is not limited and may extend to birds, small mammals, etc.

More specifically, in the case of birds and small mammals, the composition would comprise rolled oats, peanuts and/or other nuts, hulled sunflower seed, corn sugar, corn syrup, walnuts, almonds, pecans, banana, mango, papaya, raisins, dehydrated apples, cranberries, pepitas, ground corn, gelatin, glycerin, pistachios, corn gluten meal, dehulled soybean meal, pinenuts, ground wheat, wheat middlings, ground oat groats, calcium carbonate, dicalcium phosphate, soy oil, dried whole egg, dried beet pulp, salt, wheat germ meal, L-lysine, brewers dried yeast, dehydrated alfalfa meal, vitamin A supplement, choline chloride, DL-methionine, propionic acid (a preservative), yucca schidigera extract, dried cane molasses, vitamin E Supplement, vitamin B12 Supplement, ferrous carbonate, zinc oxide, riboflavin supplement, ethoxyquin (a preservative), manganous oxide, menadione sodium bisulfite Complex, (source of vitamin K activity), Niacin, Calcium Pantothenate, Copper Oxide, cholecalciferol (source of vitamin D3), pyridoxine hydrochloride, thiamine mononitrate, beta-carotene, cobalt carbonate, calcium iodate, folic acid, biotin, dried *bacillus subtilis* fermentation product, dried *bacillus coagulans* fermentation product, dried *bacillus licheniformis* fermentation product, and sodium selenite.

In accordance with the certain aspects of the present invention, it is therefore noted that while avoiding the need for a procedure such as injection molding, or for that matter conventional extrusion, the method herein provides a base material and binder composition that has an initial selected moisture level of preferably at or below 50% (wt). Accordingly, any range of moisture at or below 50% (wt) is contemplated, without limitation. Then, in the process of the manufacture of the treat or chew, the moisture level is preferably reduced to a level of at or below 15% (wt), including any range of moisture at or below such level. Therefore, for example purposes only, it is preferable that the initial moisture level of the base material and binder may be about 40-45% (wt), and the moisture level of the treat or chew ultimately produced is at or below 15% (wt). Alternatively, the initial moisture level may be about 20-25% (wt), and the final moisture level may be about 10-12% (wt).

Furthermore, in the course of the processing outlined herein, it is noted that it is preferred to maintain the temperature control of, e.g., the screw conveyor, the rollers, and/or the heated chamber, to a temperature of at or below 200° F. (95° C.). As applied to edible components, as well as the optional vitamin, mineral or herb additives, such temperatures avoid the more significant degradation in nutritional value that may occur at higher temperatures, and at higher shear rates found in conventional injection molding and extrusion type equipment. In fact, in an even more preferred embodiment, it has been found useful to maintain such temperature at or below 100° F. (37.7° C.). Accordingly, those skilled in the art will appreciate that as applied to the manufacturing approach of the present invention, temperature is selected such that the base material and/or binder is not substantially thermally degraded by the temperature selection. Expanding on such point, it is noted that the typical shear rates for injection molding of about $10^3$-$10^4$ $(\text{sec})^{-1}$ can be avoided by the present invention, as the formation of the products herein may be conducted at shear rates that are lower than such values. For example the shear rates herein through-out any stage of the process can be adjusted and maintained at or below $10^4$ $(\text{sec})^{-1}$. In addition, it further preferred embodiments, the shear rates may be maintained at or below any value or available range between 0-$10^4$ $(\text{sec})^{-1}$.

In addition to the above, it should also be understood that various alternative conveying mechanisms may be used in place of the screw conveyor. For example, the mixture of the base material and binder may be transferred via a conveyor belt, or may even be directly loaded from the mixing vessel to the feed of the rolling mill. Depending upon the nature of the binder used, it may be necessary, or at least desirable, to ensure that the mixture is maintained above a setting temperature of the binder until the mixture is introduced to the roll mill.

According to the specific exemplary embodiment, a Conbar™ roller former, available from Sollich KG, may be used as the roll mill. It should also be appreciated that the temperatures of the individual rolls may be different, and the exact temperature of each roll will vary depending upon the temperature of the mixture when it is introduced to the roll mill as well as the setting characteristics of the binder.

Consistent with the present invention, various other additives and processing aids may be advantageously combined with the base material. For example, and for the purpose of preparing a pet chew toy, it has been found preferable to add an attractant to the chew. The attractant may include a flavorant and/or an olfactory attractant. The attractant may be added in an amount of from about 1.0-5.0 wt. %, and all 0.1 wt. % increments therebetween. Such attractant may often be extracts from meat products such as chicken, liver, ham, turkey, beef and/or fish. Such attractants may be provided as a powder, an aqueous liquid, or an oil-based liquid.

The use of oil-based liquid flavoring or attractant additives and/or aqueous based flavoring or attractant additives, has previously been limited because moldable starch or protein based materials often have a very poor affinity for oil-based liquid flavoring additives and/or aqueous based flavoring additives. It has been recognized that either the oil-based flavoring or aqueous based flavoring may be selectively absorbed into vegetable or plant based fibers, such as oat fiber, corn fiber, wheat bran, cellulose. The fiber may then be distributed within the starch, protein, plant matter, or rawhide base material, such that the base material is effectively flavored and such flavoring remains within the base material in amounts sufficient to attract an animal's interest.

By providing fiber in combination with the starch, protein, plant matter, or rawhide base material both aqueous and oil-based additives may be effectively utilized and uniformly distributed in the product. Optimum additive uptake may be achieved by employing fiber in an amount of from about 1.0-10.0 wt. %, and all 0.1 wt. % increments therebetween.

In addition to assisting in the uptake and retention of oil-based and aqueous additives, fiber may be used to help maintain a final desired moisture level in the product. The hardness of the final product may be, in part, influenced by the moisture content of the product. Over time, the animal chew may tend to dry out and become harder and/or more brittle. Fiber incorporated in the chew can act as a humectant, and therefore stabilize the moisture content of the chew over time and prevent drying. Fiber may, therefore, facilitate maintaining the intended hardness of the animal chew over time.

An additive, or additives, may be introduced and/or incorporated into the product at a variety of points in the manufacturing process. According to a most basic approach, an additive may simply be mixed with the base material, e.g., the starch, protein, plant, or rawhide material, prior to processing. A dry additive, e.g. in powder, flake, or other form, may simply be mixed with the base material to provide the desired degree of dispersion or mixing. If the additive is a liquid additive, e.g. an oil-based or aqueous attractant, a greater degree of mixing, or alternative mixing techniques, may be used to achieve a desired degree of dispersion or mixing, as will be understood by those having skill in the art.

An additive may also be incorporated as a layer or coating on the product. An additive may be incorporated into a fluid, paste or powder coating composition and sprayed onto the product. Similarly, a fluid, paste, or powder coating composition may be applied to an animal chew by spreading, dip coating, etc. In yet another manner, an additive may be incorporated into the product during at least one of the mill rolling steps. An additive may be introduced, e.g. by spreading, dusting, powder coating, etc. prior to passing through a mill roll. When the mixture having the additive thereon passes through the mill roll, the pressure of the rolls against the mixture may press the applied additive into the sheet. The additive may therefore be retained and dispersed within the sheet via mechanical action.

In a variation of the above, it should be appreciated that a layer of a second material may be laminated on or consolidated with the produced sheetstock. Such second layer may include a composition with different components than a first sheet layer. Advantageously, such second layer may also be provided in the form of a sheet and is conveniently produced according to the general features of the present invention. This second layer may also be applied to the basic sheet composition prior to the mill rolling process, or after the composition is converted into a sheet, to thereby provide a product with two or more distinct layers of edible components.

The present invention has been set forth in reference to specific exemplary embodiments, but it should be understood by those skilled in the art that such exemplary embodiments are by way of illustration only. Modifications and variations will therefore be apparent and may be resorted to without departing form the spirit and equivalent scope of this invention. Accordingly, such modifications and equivalents should be considered to be within the purview of the scope of the invention as set forth in the appended claims.

What is claimed is:

1. A method of manufacturing an animal chew comprising: (a) providing a base material and a preheated binder and forming a mixture, wherein said mixture has a first selected moisture level "x"; (b) introducing and further mixing said mixture in a screw conveyor wherein the temperature of the mixture in the screw conveyor is maintained at a temperature of at or below about 200° F. and a shear rate at or below $10^4$ $(\text{sec}^{-1})$ and said moisture level is reduced to a second moisture level wherein the second moisture level <x; (c) introducing the product of step (b) on to rollers which form a sheet and wherein said rollers provide cooling; (d) introducing the product of step (c) into a cooled chamber at a selected temperature; (e) cutting said product of step (d) into a desired shape.

2. The method of claim 1 wherein the base material is an edible material.

3. The method of claim 2 wherein the edible material is selected from the group consisting of starch, rice meal, soybean, casein, denatured and partially hydrolyzed casein, protein, rawhide, dairy, meat by-products, plant, vegetable matter or animal matter, and mixtures thereof.

4. The method of claim 1 wherein said cooled chamber comprises a cooling tunnel.

5. The method of claim 1 wherein the moisture level "x" is at or below 50% (wt).

6. The method of claim 1, wherein the a final moisture level is at or below 15% (wt).

7. The method of claim 1, wherein the a final moisture level is between 10-12% (wt).

8. The method of claim 1 wherein said preheated binder upon cooling serves to bind said mixture together.

9. The method of claim 1 further comprising laminating on or consolidating with a second layer, having different components than said mixture.

10. The method of claim 9 further comprising applying said second layer prior to introducing the product of step (b) on to rollers.

* * * * *